A. R. THOMPSON.
PEACH PITTER.
APPLICATION FILED JUNE 7, 1921.
1,389,795.
Patented Sept. 6, 1921.
3 SHEETS—SHEET 1.
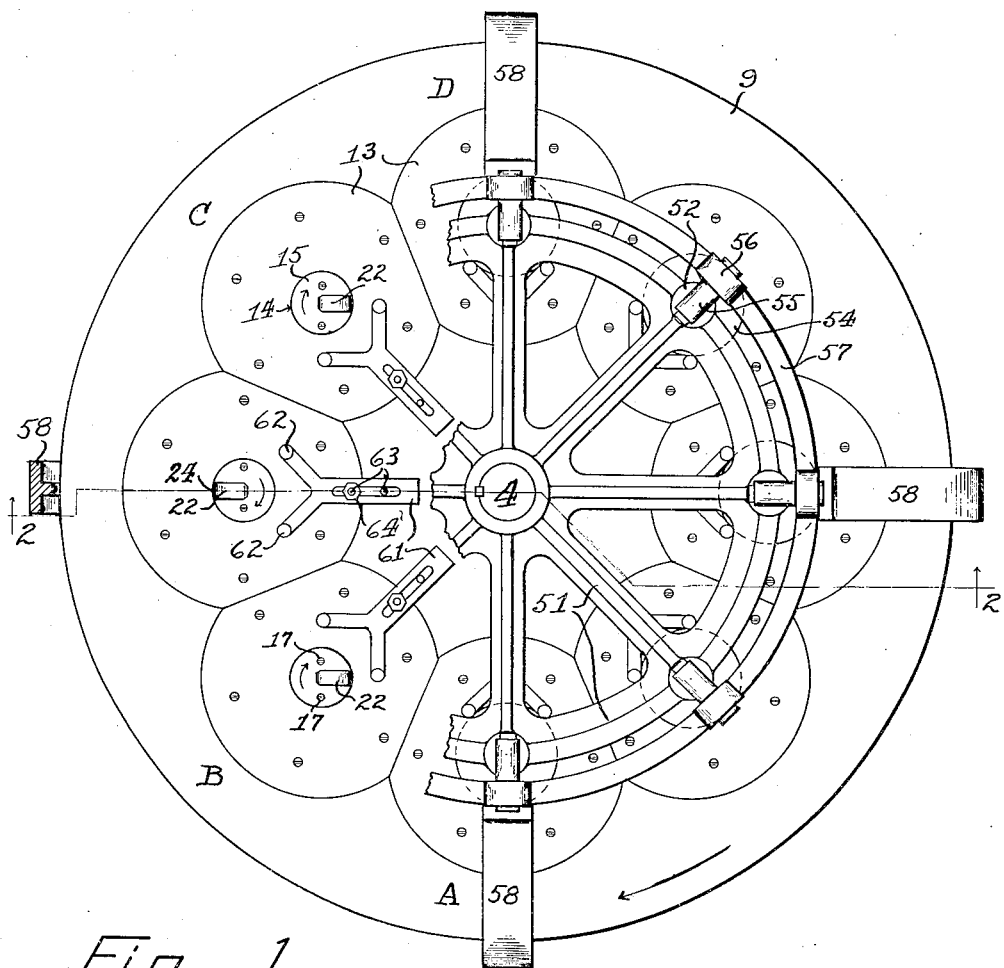
Fig_1
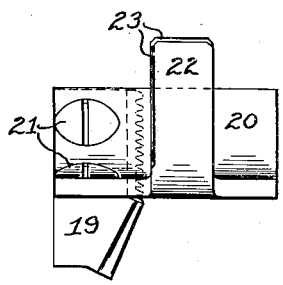
Fig_5
INVENTOR
Albert R. Thompson
BY
Booth & Booth
ATTORNEYS

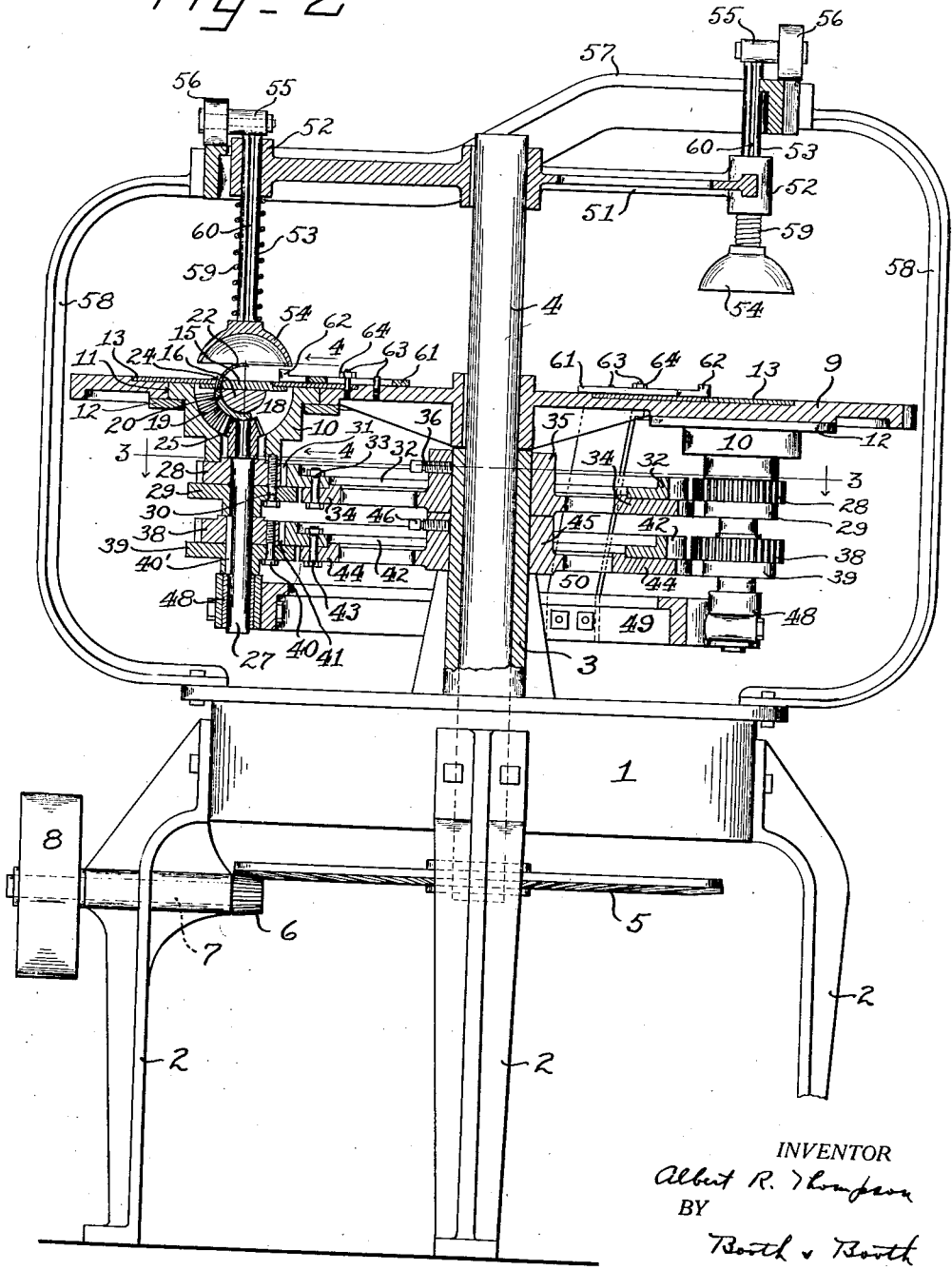

A. R. THOMPSON.
PEACH PITTER.
APPLICATION FILED JUNE 7, 1921.

Patented Sept. 6, 1921.

INVENTOR
Albert R. Thompson
BY
Booth & Booth
ATTORNEYS

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

PEACH-PITTER.

1,389,795.

Specification of Letters Patent.

Patented Sept. 6, 1921.

Application filed June 7, 1921. Serial No. 475,642.

*To all whom it may concern:*

Be it known that I, ALBERT R. THOMPSON, a citizen of the United States, residing at San Jose, in the county of Santa Clara and State of California, have invented certain new and useful Improvements in Peach-Pitters, of which the following is a specification.

My invention relates to a continuously operating machine for removing pits from fruit, particularly cling-stone peaches.

In the preparation of these peaches for canning, it is customary to remove the pits by hand. This involves considerable labor, and results in increased expense. It is the object of my present invention to do away with practically all hand labor in the pitting of such fruit, by providing a machine for automatically removing the pits with a minimum of waste. A further object of my invention is to provide a machine adapted for continuous and rapid operation, into which the fruit may be successively and continuously fed, and from which the fruit and freed pits may be similarly removed.

Generally speaking, the machine embodying my invention comprises a continuously revolving table upon which the fruit, which has been previously halved, is successively placed. As the table passes through one complete revolution, the halved fruit placed thereupon is automatically freed from the pit, and is successively removed at a point in proximity to the feeding position.

A full description of my invention follows, with reference to the accompanying drawings, wherein—

Figure 1 is a partly broken plan view of my machine.

Fig. 2 is a broken vertical section, the sectional portion being taken in the direction of the arrows on the line 2—2 of Fig. 1, and certain parts being omitted for the sake of clearness.

Fig. 5 is a plan view, enlarged, of one of the cutters removed from its holder.

Figure 3:
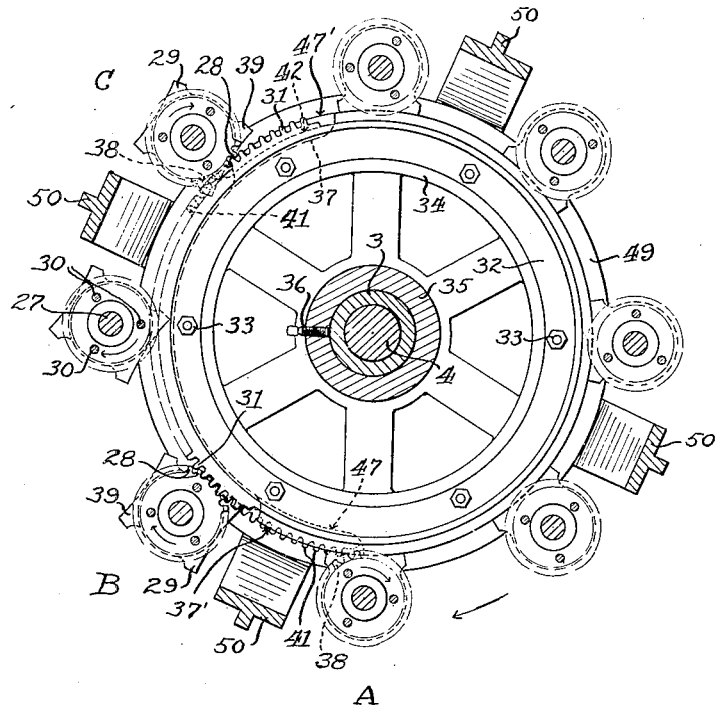
Fig. 3 is a transverse section taken in the direction of the arrows on the line 3—3 of Fig. 2.

In the drawings, and referring now particularly to Fig. 2 thereof, the reference numeral 1 designates a cylindrical base, which is supported by legs 2. A fixed central bearing sleeve 3 rises from said base 1 and supports a vertical rotatable shaft 4. Said shaft is rotated by means of a bevel gear 5 fixed upon its lower end, and which meshes with a bevel pinion 6 secured to a horizontal shaft 7 journaled in one of the legs 2. A pulley 8, adapted for receiving power from any convenient outside source, not shown in the drawings, is secured to the outer end of said horizontal shaft 7.

The vertical shaft 4 carries a revolving horizontal table 9, Figs. 1 and 2, upon which are mounted a series of similar and symmetrically positioned pitting mechanisms, each of which performs one entire cycle of operations during one complete revolution of the table 9. Said pitting mechanisms operate successively, and the table 4 revolves continuously, so that the fruit is fed successively to said mechanisms as each passes a given position, and is successively removed therefrom at another point. In Fig. 1 of the drawings I have shown eight such pitting mechanisms positioned at regular intervals about the table 4, but in Fig. 2 only two are shown, the others which would naturally appear in such a view having been omitted for the sake of clearness. All said cutting mechanisms are identical in construction and operation, so that a description of one, followed through its entire cycle, will suffice for all.

Figure 4:
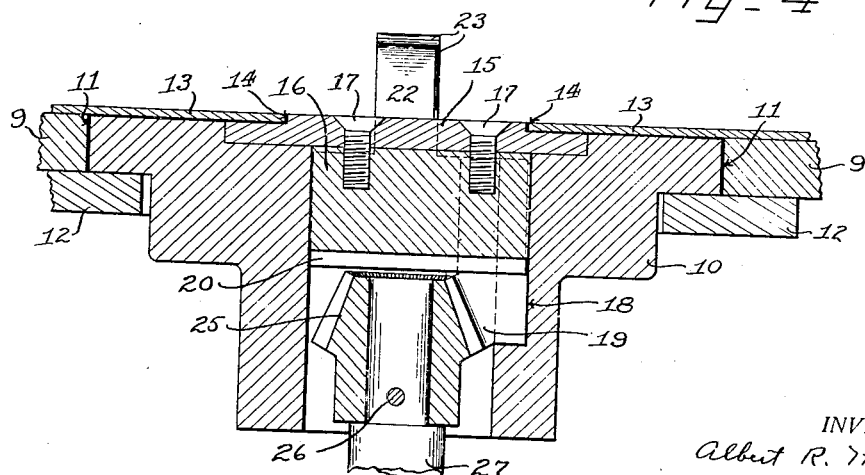
Fig. 4 is a vertical section, enlarged, of one of the cutters and its holder, taken in the direction of the arrows on the line 4—4 of Fig. 2.

A cutter-holder 10, Figs. 2 and 4, is mounted for rotation about its vertical axis, in an aperture 11 formed in the table 9, and is retained in position by a lower ring 12 and an upper plate 13, the latter being shown also in Fig. 1. Said upper plate 13 is flush with the top of the table 9, and has a central circular aperture 14, which is closed by a shouldered disk 15 secured to the cutter holder 10 by screws or dowels not shown in the drawings.

The central portion of said disk is flush with the upper surface of the plate 13, and its peripheral portion, which is thinner than said central portion, lies under said plate 13, and between it and an annular recess in the upper surface of the cutter holder 10, as shown in Figs. 2 and 4. Said disk, being secured to said cutter holder, rotates therewith, its central portion turning within the aperture 14 formed in the plate 13.

A semi-cylindrical block 16, Figs. 2 and 4, is secured to the under surface of the disk 15 by means of screws 17—Fig. 4. An arcuate groove 18, Figs. 2 and 4, is formed interiorly in one side of the cutter holder 10, said groove being concentric with the semi-cylindrical lower surface of the block 16. A segmental bevel-gear 19 lies within said groove 18, and is adapted to travel therein through an arc of approximately 90 degrees. A cutter 20, Figs. 2, 4 and 5, is secured to said segmental bevel gear 19 as by means of screws 21, Fig. 5. Said cutter 20 comprises a segment of a hollow cylinder whose inside radius is the same as that of the semi-cylindrical block 16. Said cutter is approximately 90 degrees in width, and its length is the same as that of said block. An arcuate blade 22, having the same radius as the body of the cutter 20, and beveled to a knife edge upon its end and one side, as shown at 23 in Fig. 5, is formed integrally with the cutter body 20, and extends from one side edge thereof. Said blade is adapted to pass through an aperture 24, Figs. 1 and 2, formed in the disk 15.

By reference to Fig. 2, it will be seen that the cutter 20 and the segmental bevel gear 19 are capable of a movement of approximately 90° in an arcuate path concentric with the block 16, this movement being sufficient to elevate the blade 22 from a position approximately flush with the top of the table 9 to the position in which it is shown. This motion is imparted to the cutter by a bevel pinion 25, Figs. 2 and 4, which meshes with the segmental bevel gear 19, and which is fixed, as by means of a pin 26, Fig. 4, upon the upper end of a short vertical shaft 27, Figs. 2 and 4.

The shaft 27 is journaled within a spur gear pinion 28 and a Geneva-lock member 29, Figs. 2 and 3, both of which are secured to the cutter holder 10 by means of screws 30. The pinion 28 meshes with gear teeth 31 formed, for a portion of its circumference, upon the periphery of a ring 32, which is secured, as by bolts 33, to the rim of a stationary horizontal spider 34, whose hub 35 is mounted upon the central vertical sleeve 3 and secured thereupon by a set screw 36. The periphery of said spider forms the coöperating member for the Geneva-lock, as shown in Fig. 3, there being a portion of said periphery cut away, as shown at 37, corresponding to the toothed portion 31 of the ring 32, so that the lock member 29 may revolve with the pinion 28 when the latter is in mesh with the teeth 31. When said pinion is passing the smooth portion of the gear ring 32, the lock member 29 coöperates with the peripheral portion 37' of the spider 34, thereby preventing said pinion from turning and holding it in position for engagement with the first of the series of teeth 31.

Below the pinion 28 and lock member 29 are a second pinion 38 and a second lock member 39, respectively, similar in dimensions to the upper pinion and lock member. Said lower pinion and lock member are secured together by screws 40, one of which is shown in Fig. 2, and are fixed upon the shaft 27 by a key 40'. The pinion 38 meshes with teeth 41 formed, for a portion of its circumference, upon the periphery of a ring 42, Fig. 2, secured by bolts, one of which is shown at 43, to a second spider 44, whose hub 45 is secured upon the central sleeve 3 by a set screw 46. Said second spider has a portion of its periphery cut away, as shown at 47, in Fig. 3, and the remainder 47' of its periphery is adapted to coöperate with the lower lock member 39.

The shaft 27 has a bearing 48, Fig. 2, at its lower end, said bearing being secured to a ring 49 carried by brackets 50, Figs. 2 and 3, extending downwardly from the under side of the table 9. Four such brackets are shown in Fig. 3, but only one in Fig. 2. The ring 49, being carried by the table 9, revolves with it, carrying the shafts 27 with their pinions, lock members, and the cutter holders, in an epicyclic manner about the stationary spiders 34 and 44.

It will be seen from Fig. 3 that the gear portion 41, carried by the lower fixed spider 44, is advanced with respect to the gear portion 31, carried by the upper fixed spider 34. Therefore, assuming the direction of revolution to be as indicated by the arrow, the lower pinion 38 will begin to rotate at the position A, and will make about half a revolution about its own axis, before the upper pinion 28 begins to rotate, slightly before the position B is reached.

This half-revolution of the lower pinion 38, while the upper pinion 28 is relatively stationary, is sufficient, acting through the shaft 27, the bevel pinion 25, and the gear segment 18, Fig. 2, to elevate the cutter blade 22 from its inoperative position to the position shown in said Fig. 2. When the cutter blade has been so elevated, the upper pinion 28 begins rotating upon its axis, carrying with it the cutter holder 10. Said cutter holder and the shaft 27 are now rotating together, as a unit, so that there is no relative movement between them, and the cutter blade therefore remains in its elevated position, but is revolved, along with the cutter holder 10, about the vertical axis of said cutter holder.

When the cutter holder has made somewhat more than one complete revolution about its own axis, the lower pinion 38 reaches the end of its coacting series of teeth 41, at about the position C, and ceases to rotate about its own axis. The shaft 27 is therefore held relatively stationary, while the surrounding cutter holder continues to rotate for about half a turn. This relative motion between the cutter holder and the shaft 27 amounts to a reversal of the relative motion produced at the inception of the operation, and results in the cutter blade 22 being retracted from the position shown in Fig. 2 to its lower or inoperative position. Finally, when the position D of Fig. 3 is reached, the upper pinion 28 has also ceased to rotate, so that the entire cutting mechanism is inoperative, and remains so until the revolution of the table 9 again carries it to the position A.

The central vertical shaft 4 is extended upwardly above the table 9, and carries a revolving spider 51, Figs. 1 and 2. About the periphery of this spider is a series of guides 52, positioned in vertical alinement with the axes of the cutter holders 10.

Each of said guides carries a vertically slidable bar 53, Fig. 2, upon the lower end of which is mounted a fruit-holding cup 54. The upper end of the bar 53 has a transverse head 55, which carries a roller 56, Figs. 1 and 2. The rollers 56 run upon a fixed annular cam track 57 supported by brackets 58 rising from the base 1. Said cam track is elevated for a portion of its circumference, so that the fruit-holding cups 54 are raised between the positions D and A of Figs. 1 and 3, to permit the feeding and removing of the fruit, and are lowered between the positions A and D to hold the fruit in operative relation to the cutter blade. Springs 59 hold the cups 54 firmly against the fruit while the rollers 56 are traveling over the depressed portion of the cam track, and keyways 60, formed in the sliding bars 53, coöperate with feathers (not shown) in the guides 52 to prevent rotation of said bars. In Fig. 2 of the drawings only two of the above described fruit holding mechanisms are shown, the others, which would naturally appear in such a view, being omitted for the sake of clearness.

Adjustable guides 61, Figs. 1 and 2, are mounted upon the table 9 in radial alinement with the axes of the cutter holders 10. Each of said guides, as shown in Fig. 1, comprises a slotted shank, bifurcated at its outer end, the ends of the branches having raised buttons 62 against which the fruit may be placed to be properly located.

Studs 63, projecting through the slot in the shank portion of the guide, hold the same in position, one of said studs having a clamping nut 64 screwed upon its end. Thus by loosening the nuts 64, the guides 61 may be moved in or out to accommodate fruit of various sizes.

As before stated, the fruit is halved, through both flesh and pit, before feeding into the machine. The halved fruit is then placed successively upon the table 9, cut side down, one piece over each cutting mechanism. This is done, in the present instance by hand, at any convenient point between the positions D and A. The guides 61 have been so set previously, with relation to the size of the fruit, that when said fruit is placed against the end buttons 62, its center will lie directly over the center of the cutter holder.

As the table proceeds in its revolution, and as the cutter holder over which a given half-fruit has been placed approaches the position A, the holding cup 54 descends, as its roller 56 runs on to the lower portion of the cam track 57, and the fruit is firmly clamped in position between said cup and the table top.

Then, as the position A is passed, the lower pinion 38 begins to revolve, thus elevating the cutter 20 and causing its blade 22 to penetrate the fruit, immediately outside the edge of the pit, and to pass up and partway over said pit in an arcuate path. Further revolution of the table from B to C causes the upper pinion 28 to revolve as well as the lower pinion 38, thus holding the blade 22 in its elevated position, and causing it to make somewhat more than a complete revolution about its vertical axis, thus passing completely around the pit and freeing said pit entirely from the fruit. From C to D the cutter is lowered, as above described, retracting its blade to the surface of the table, and finally, at the position D, the holding cup 54 is raised, and both the fruit and its freed pit may be removed from the table in any desired manner.

The revolution of the table 9 is continuous, and, as each cutter holder in succession passes from positions D to A, the fruit and its freed pit are removed therefrom and a fresh piece placed thereupon. The freeing of the pit is accomplished by the cutting action of the blade 22, which, on account of its arcuate form, passes very close to the surface of the pit. There is, therefore, a minimum of waste by a portion of the fruit being cut away with the pit.

I claim:—

1. A peach-pitter comprising a table; means for holding the fruit on the table; an underlying blade; means for imparting to said blade a reciprocative movement in a plane intersecting the plane of the table surface, adapting it to initially penetrate the fruit, exterior to the pit; and means for revolving the penetrated blade about the pit.

2. A peach-pitter comprising a table; means for holding the fruit on the table; an underlying arcuate blade; means for imparting to said blade a reciprocative movement in an arcuate path in a plane intersecting the plane of the table surface, adapting it to initially penetrate the fruit, exterior to the pit; and means for revolving the penetrated blade about the pit.

3. A peach-pitter comprising a table;

means for holding the fruit on the table; an underlying rotatable cutter-holder; a blade carried by said cutter-holder; means for reciprocating said blade in a plane intersecting the plane of the table surface adapting it to initially penetrate the fruit, exterior to the pit; and means for rotating the cutter holder to revolve the penetrated blade about the pit.

4. A peach-pitter comprising a table; means for holding the fruit on the table; an underlying rotatable cutter-holder; an arcuate blade carried by said cutter holder; means for reciprocating said blade in an arcuate path in a plane intersecting the plane of the table surface, adapting it to initially penetrate the fruit, exterior to the pit; and means for rotating the cutter-holder to revolve the penetrated blade about the pit.

5. A peach-pitter comprising a table; means for holding the fruit on the table; means adapting said holding means for varying sizes of fruit; an underlying blade; means for reciprocating said blade in a plane intersecting the plane of the table surface, adapting it to initially penetrate the fruit, exterior to the pit; and means for revolving the penetrated blade about the pit.

6. A peach-pitter comprising means for holding the fruit; a reciprocative blade adapted to penetrate the fruit, exterior to the pit; and means for revolving said penetrated blade about the pit.

7. A peach-pitter comprising means for holding the fruit; a reciprocative arcuate blade adapted to penetrate the fruit in an arcuate path, exterior to the pit; and means for revolving said penetrated blade about the pit.

8. A peach-pitter comprising a rotatable table; means for holding the fruit on said table; an underlying cutter holder carried by and revolving with said table, said holder being mounted for independent rotation on its own axis; a blade carried by the holder adapted for reciprocative movement in a plane intersecting the plane of the table surface; means dependent upon the rotation of the table for reciprocating said blade to effect its initial penetration into the fruit, exterior to the pit; and means also dependent upon the rotation of the table for rotating the cutter holder on its own axis, to revolve the penetrated blade about the pit.

9. A peach-pitter comprising a rotatable table; means for holding the fruit on said table; means adapted for adjusting said holding means to different sizes of fruit; an underlying cutter holder carried by and revolving with said table, said holder being mounted for independent rotation on its own axis; a blade carried by the holder adapted for reciprocative movement in a plane intersecting the plane of the table surface; means dependent upon the rotation of the table for reciprocating said blade to effect its initial penetration into the fruit, exterior to the pit; and means also dependent upon the rotation of the table for rotating the cutter holder on its own axis, to revolve the penetrated blade about the pit.

10. A peach-pitter comprising a rotatable table; means for holding the fruit on said table; an underlying cutter-holder carried by and revolving with said table, said holder being mounted for independent rotation on its own axis; an arcuate blade carried by the holder, adapted for reciprocative movement in an arcuate path in a plane intersecting the plane of the table surface; means dependent upon the rotation of the table for reciprocating said blade, to effect its initial penetration into the fruit in an arcuate path, exterior to the pit; and means also dependent on the rotation of the table for rotating the cutter holder on its own axis and revolving the penetrated blade about the pit.

11. A peach-pitter comprising a rotatable table; means for holding the fruit on said table; an underlying cutter-holder carried by and revolving with said table, said holder being mounted for independent rotation about its own axis; a blade carried by the holder adapted for reciprocative movement in a plane intersecting the plane of the table surface to initially penetrate the fruit, exterior to the pit; means for reciprocating said blade, consisting of a shaft rotatably mounted in the axis of the cutter holder; gearing connecting said shaft and blade; a non-rotatable ring fitted about the axis of the table, and gearing between said ring and shaft; and means for rotating said cutter holder and blade as a unit about the axis of said holder, to revolve the penetrated blade about the pit, consisting of a second non-rotatable ring fitted about the axis of the table, and gearing between said ring and cutter-holder.

12. A peach-pitter comprising a rotatable table; an overlying member rotatable with said table, for holding the fruit thereon; means dependent upon the rotation of the table for moving said fruit-holding member into and out of position to hold and to release the fruit; an underlying cutter-holder carried by and revolving with said table, said holder being mounted for independent rotation about its own axis; a blade carried by the holder adapted for reciprocative movement in a plane intersecting the plane of the table surface, to initially penetrate the fruit, exterior to the pit; means for reciprocating said blade, consisting of a shaft rotatably mounted in the axis of the cutter holder; gearing connecting said shaft and blade; a non-rotatable ring fitted about the axis of the table, and gearing between said ring and shaft; and means for rotating said cutter holder and blade as a unit about the axis of said holder, to revolve the penetrated blade about the pit, consisting of a second non-rotatable ring fitted about the axis of the table, and gearing between said ring and cutter-holder.

13. A peach-pitter comprising a rotatable table; an overlying reciprocative member rotatable with said table, for holding the fruit thereon; a fixed cam-track and means associated therewith for moving said fruit-holding member into and out of position to hold and to release the fruit; an underlying cutter-holder carried by and revolving with said table, said holder being mounted for independent rotation about its own axis; a blade carried by the holder adapted for reciprocative movement in a plane intersecting the plane of the table surface, to initially penetrate the fruit, exterior to the pit; means for reciprocating said blade, consisting of a shaft rotatably mounted in the axis of the cutter holder; gearing connecting said shaft and blade; a non-rotatable ring fitted about the axis of the table, and gearing between said ring and shaft; and means for rotating said cutter holder and blade as a unit about the axis of said holder, to revolve the penetrated blade about the pit, consisting of a second non-rotatable ring fitted about the axis of the table, and gearing between said ring and cutter-holder.

14. A peach-pitter comprising a rotatable table; means for holding the fruit thereon; an underlying cutter-holder carried by and revolving with said table, said holder being mounted for independent rotation about its own axis; a blade carried by the holder, adapted for reciprocative movement in a plane intersecting the plane of the table surface, adapting it to initially penetrate the fruit, exterior to the pit; a shaft mounted in the axis of the cutter-holder for independent rotation; a pinion on the shaft and a gear segment carried by the blade with which the pinion engages; a non-rotatable ring extended from the axis of the table, said ring having a peripheral toothed section; a gear on the shaft meshing with said section; a lock associated with said ring and shaft for holding the shaft against rotation outside the limits of the toothed section of the ring; a second non-rotatable ring extended from the axis of the table and having a peripheral toothed section whose limits are later with relation to those of the toothed section of the first ring; a gear on the cutter holder adapted to engage the toothed section of the second ring; and a lock associated with said second ring and said cutter-holder for holding the cutter-holder against rotation outside the limits of the toothed section of said second ring.

15. In a peach-pitter, the combination of a table upon which the fruit is held; an underlying rotatable cutter-holder carried by the table, said holder having formed in its upper end an arcuate groove in a vertical plane; an arcuate cutter and attached gear segment mounted for movement in said groove; a correspondingly arcuate blade extended upwardly from said cutter, adapted to be projected above and to be retracted below the plane of the table surface, to penetrate the fruit and to withdraw therefrom; means for reciprocating said cutter to cause its blade to penetrate and to withdraw from the fruit; and means for rotating said cutter holder to revolve the penetrated blade.

In testimony whereof I have signed my name to this specification.

ALBERT R. THOMPSON.